W. E. ELAM.

SHOE BLACKING DEVICE.

APPLICATION FILED JAN. 6, 1917.

Reissued June 11, 1918. 14,484.

Inventor

William E. Elam

Witness

Edwin L. Bradford

By Crane & Greene,

Attorneys

BOBBS PETERS INC., LITHO., WASHINGTON, D. C.

UNITED STATES PATENT OFFICE.

WILLIAM E. ELAM, OF WASHINGTON, DISTRICT OF COLUMBIA.

SHOE-BLACKING DEVICE.

14,484. Specification of Reissued Letters Patent. Reissued June 11, 1918.

Original No. 1,191,879, dated July 18, 1916, Serial No. 77,947, filed February 12, 1916. Application for reissue filed January 6, 1917. Serial No. 140,914.

*To all whom it may concern:*

Be it known that I, WILLIAM E. ELAM, a citizen of the United States, residing at Washington, in the District of Columbia, have invented certain new and useful Improvements in Shoe-Blacking Devices, of which the following is a specification, reference being had therein to the accompanying drawing.

The general object of my invention is to provide devices of the reservoir type by which the supply of paste or like material is renewed by merely substituting a fresh collapsible tube of the material for an empty one.

The particular object is to provide a suitable, inexpensive holder for a collapsible tube containing blacking in combination with devices by which the blacking is supplied directly to the shoe through a suitable passage.

In these drawings, A represents a block having an inclined face $A^1$ for spreading paste, a supply passage $A^2$, a brush $A^3$, a circular, preferably slight coned portion $A^4$, a rearward extension $A^5$ and an internally threaded sleeve $A^6$, connecting with passage $A^2$. The inclined face $A^1$, which is not necessarily flat, may be reduced in area by cutting it away laterally as at $A^7$.

Figure 1:
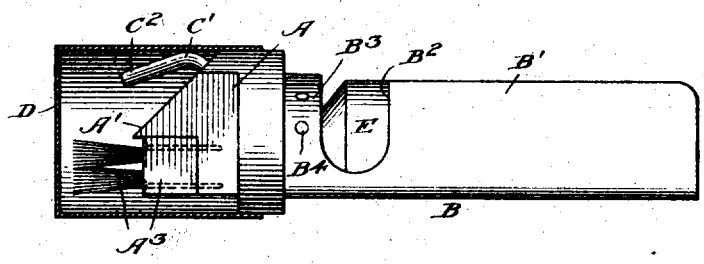
Figure 1 is a side elevation of the device, with the cover broken away.
Figure 2:
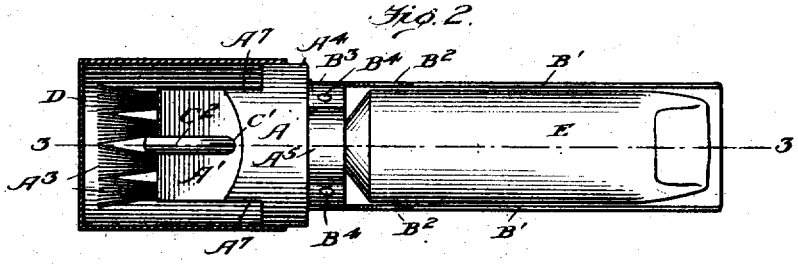
Fig. 2 is a view looking down on the device as shown in Fig. 1, the cover being broken away.
Figure 3:
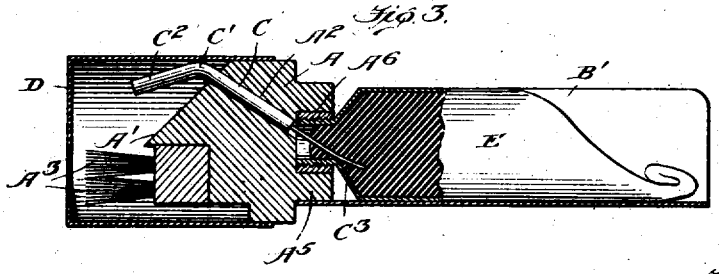
Fig. 3 is a partial section on the line 3—3 of Fig. 2.
Figure 4:
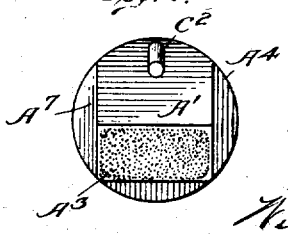
Fig. 4 is a view looking from the left of Fig. 1, the cover being removed.
Figure 5:
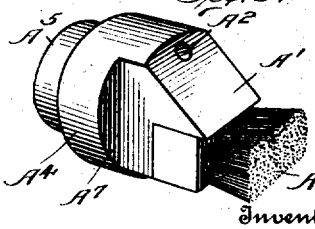
Fig. 5 is a perspective view of a block and brush forming the head or body of the dauber.

As clearly shown in Figs. 1, 3 and 5, the general plane of the face $A^1$ meets the flexible portion or bristles of the brush at some distance from the bristle holding member and hence said portion readily bends laterally to the rear of that plane so that in spreading the blacking the brush holds no part of the face away from the shoe, no blacking accumulates in use on the face near the brush, and none is forced directly into the brush near said member.

To the rearward extension $A^5$ of the block is connected a trough-like handle B preferably of channel shaped sheet metal having sides $B^1$, cut away to form finger slots $B^2$ and attaching arms $B^3$ which partially encircle $A^5$ and are secured to the latter by nails $B^4$.

The passage $A^2$ is normally closed by a stopper or plug C bent at $C^1$ to form a handle $C^2$ and having at its inner end a reduced portion $C^3$, extending into the body of the blacking. The blacking applying end of the device is normally covered by a cap D, preferably made of sheet metal, and adapted to fit tightly over the coned portion $A^4$ of the block.

In use, a tube E of blacking, such as is now supplied by blacking manufacturers, is attached to the device by screwing the threaded end of the tube into the sleeve $A^6$, which may be done by grasping the tube through the openings $B^2$ and rotating the tube relatively to handle B. To apply blacking to a shoe, the cap D and plug C are removed, and pressure is applied to the collapsible tube, the face $A^1$ is moved over the leather to apply the blacking thereto, and the blacking is then fully distributed and worked into all inequalities and angles at the sole by means of the brush $A^3$.

The plug C serves to seal the outlet for blacking and also to prevent stoppage by dried blacking, while the cap D serves to retard the drying out of the unused blacking as well as to prevent injury to or by this end portion which is more or less covered with blacking.

What I claim is:

1. The combination with a block having an oblique working face, a brush alongside said face and a passage leading from said face through the block to the side opposite said face, of a blacking receptacle detachably secured to said side and internally continuous with said passage, and a removable cap engaging the block peripherally and hermetically covering said oblique face and brush.

2. The combination with a block having an oblique working face, a brush alongside that face, and a passage leading from that face through the block to the opposite side, of a removable cap peripherally engaging the block and hermetically inclosing said face and brush, a removable plug normally closing the passage, a collapsible blacking tube detachably secured to said opposite side and integrally continuous with said passage, and a trough handle fixed to the block, protecting three sides of the tube and provided with lateral slots to permit manipulating the tube within the trough.

3. The combination with a rigid trough-like handle open at one end adapted to receive and protect a collapsible tube, of a block fixed in and projecting from one end of the trough, having an oblique blacking applying face, a threaded recess opposite that face in position to receive the usual threaded end of such tube, and with a passage leading from said recess to said face, and a removable plug adapted to close said passage and extend into the end portion of a tube when the latter is in place in the block.

4. The combination with an open trough-like handle of stiff material, of a blacking applying block fixed in and projecting from one end of the trough, and adapted to receive and distribute blacking from a collapsible tube secured in the block, said handle being cut away on opposite sides near said block to permit grasping a tube therein with the fingers.

5. The combination with a paste spreading shoe brush, of an adjacent block having a paste applying face extending from near the middle of the side of the pliable portion of the brush obliquely away from both the axis and the face of the brush, whereby the free end portion of the bristles, without abrupt bending, may lie flat upon the shoe when paste is properly applied by the oblique face of the block.

6. The combination with a paste spreading brush, of a closely adjacent block having a paste applying face extending, at a point near the middle of the side of the free portion of the bristles, obliquely away from both the axis and the face of the brush, and means for supplying paste to the paste applying face.

In testimony whereof I affix my signature.

WILLIAM E. ELAM.